(12) United States Patent
Ono et al.

(10) Patent No.: US 12,526,064 B2
(45) Date of Patent: Jan. 13, 2026

(54) SYSTEM AND METHOD FOR ESTIMATING RADIO PERFORMANCE OF MANUFACTURING SITE

(71) Applicant: Hitachi, Ltd., Tokyo (JP)

(72) Inventors: Go Ono, Tokyo (JP); Hajime Kanzaki, Tokyo (JP); Eriko Takeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 801 days.

(21) Appl. No.: 17/867,757

(22) Filed: Jul. 19, 2022

(65) Prior Publication Data

US 2023/0075902 A1    Mar. 9, 2023

(30) Foreign Application Priority Data

Sep. 7, 2021   (JP) .................. 2021-145205

(51) Int. Cl.
*H04B 17/318* (2015.01)
*H04B 17/391* (2015.01)
*H04W 16/22* (2009.01)

(52) U.S. Cl.
CPC ....... *H04B 17/318* (2015.01); *H04B 17/3913* (2015.01); *H04W 16/225* (2013.01)

(58) Field of Classification Search
CPC .......... H04B 17/318; H04B 17/3913; H04B 17/391; H04W 16/225; H04W 16/14;
(Continued)

(56) References Cited

U.S. PATENT DOCUMENTS 10,548,025 B2   1/2020   Jobe et al.
2006/0140146 A1   6/2006   Funk et al.
(Continued)

FOREIGN PATENT DOCUMENTS

DE        103 54 472 A1   1/2005
DE   10 2008 028 541 A1   1/2010
(Continued)

OTHER PUBLICATIONS

German Office Action received in corresponding German Application No. 10 2022 119 881.2 dated Jan. 20, 2025.

*Primary Examiner* — Fred A Casca
(74) *Attorney, Agent, or Firm* — MATTINGLY & MALUR, PC

(57) ABSTRACT

The system stores process information including information on processes before starting at a manufacturing site, and management information that manages radio performance estimation methods usable for each of applications and information for determining a processing time of each of the radio performance estimation methods. The process information includes information on applications used in each process of the processes and information on a time associated with each process. The system refers to the process information and the management information so as to determine radio performance estimation methods usable in each process, and refers to the process information and the management information so as to select a wireless communication method, through which radio performance estimation processing is completed by a time associated with each process, from the radio performance estimation methods usable in each process.

10 Claims, 13 Drawing Sheets

(58) Field of Classification Search
CPC . H04W 16/18; H04W 64/003; G01S 5/02524; G01S 11/06
See application file for complete search history.

(56) References Cited

U.S. PATENT DOCUMENTS

| | | | | |
|---|---|---|---|---|
| 2015/0109940 | A1* | 4/2015 | Okhravi | H04L 43/0888 370/252 |
| 2019/0082328 | A1 | 3/2019 | Garcia et al. | |
| 2020/0367094 | A1* | 11/2020 | Eriksson | H04W 40/02 |
| 2023/0023406 | A1* | 1/2023 | Hasegawa | H04W 24/04 |

FOREIGN PATENT DOCUMENTS

| | | |
|---|---|---|
| DE | 11 2020 005 477 T5 | 9/2022 |
| JP | 2019-509685 A | 4/2019 |

* cited by examiner

PROCESS A

PROCESS B

PROCESS C

FIG. 4

PRODUCTION PLAN INFORMATION | APPLICATION INFORMATION

| PRODUCTION PROCESS | PRODUCT | INSTALLED OBJECT | POSITION | SIZE | MATERIAL | START TIME | END TIME | REQUIRED APPLICATION |
|---|---|---|---|---|---|---|---|---|
| COMMON | | BASE STATION | x,y,z | w,d,h | PLASTIC | | | |
| PROCESS A | PRODUCT A | CAMERA (WIRELESS) | x,y,z | w,d,h | PLASTIC | 10:00 | 13:00 | MOVING IMAGE |
| | | COMPONENT A1 | x,y,z | w,d,h | ALUMINUM | | | |
| | | COMPONENT A2 | x,y,z | w,d,h | COPPER | | | |
| | | COMPONENT A3 | x,y,z | w,d,h | ssss | | | |
| | | DEVICE A4 | x,y,z | w,d,h | ssss | | | |
| | | DEVICE A5 | x,y,z | w,d,h | ssss | | | |
| PROCESS B | PRODUCT B | SENSOR (WIRELESS) | x,y,z | w,d,h | ssss | 14:00 | 18:00 | LOG COLLECTION |
| | | SENSOR (WIRELESS) | x,y,z | w,d,h | ssss | | | |
| | | DEVICE B1 | x,y,z | w,d,h | ssss | | | |
| | | DEVICE B2 | x,y,z | w,d,h | ssss | | | |
| | | COMPONENT B3 | x,y,z | w,d,h | ssss | | | |
| PROCESS C | PRODUCT C | CAMERA (WIRELESS) | x,y,z | w,d,h | PLASTIC | 19:00 | 21:00 | LOG COLLECTION MOVING IMAGE REMOTE CONTROL |
| | | SENSOR (WIRELESS) | x,y,z | w,d,h | ssss | | | |
| | | SENSOR (WIRELESS) | x,y,z | w,d,h | ssss | | | |
| | | ROBOT ARM (WIRELESS) | x,y,z | w,d,h | ssss | | | |
| | | COMPONENT C1 | x,y,z | w,d,h | ALUMINUM | | | |
| | | COMPONENT C2 | x,y,z | w,d,h | COPPER | | | |
| | | COMPONENT C3 | x,y,z | w,d,h | ssss | | | |
| | | DEVICE C4 | x,y,z | w,d,h | ssss | | | |
| | | DEVICE C5 | x,y,z | w,d,h | ssss | | | |

PROCESS PLAN

FIG. 5A

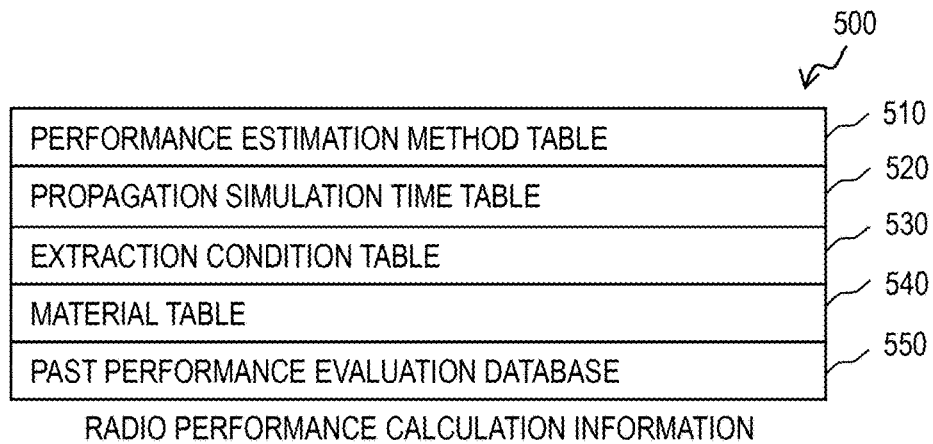

RADIO PERFORMANCE CALCULATION INFORMATION

FIG. 5B

| APPLICATION | PERFORMANCE ESTIMATION METHOD |
|---|---|
| LOG COLLECTION | DATABASE QUOTATION<br>SIMPLE SIMULATION<br>HIGH-ACCURACY SIMULATION |
| MOVING IMAGE | SIMPLE SIMULATION<br>HIGH-ACCURACY SIMULATION |
| REMOTE CONTROL | HIGH-ACCURACY SIMULATION |

PERFORMANCE ESTIMATION METHOD TABLE

FIG. 5C

| NUMBER OF INSTALLED OBJECTS | PROPAGATION SIMULATION TIME |
|---|---|
| 1 | XX |
| 2 | XX |
| 3 | XX |
| : | : |

PROPAGATION SIMULATION TIME TABLE

FIG. 5D

| SHIELDING | PARAMETER | CALCULATION EXCLUSION POSSIBILITY CONDITION |
|---|---|---|
| NO | SIZE | EQUAL TO OR HIGHER THAN THRSIZE |
|  | DISTANCE | LESS THAN THRDIST |
| YES |  | ANY |

EXTRACTION CONDITION TABLE

FIG. 5E

| MATERIAL | REFLECTANCE | DIELECTRIC CONSTANT |
|---|---|---|
| ALUMINUM | xx | xx |
| GLASS | xx | xx |
| WOOD | xx | xx |
| : |  |  |

MATERIAL TABLE

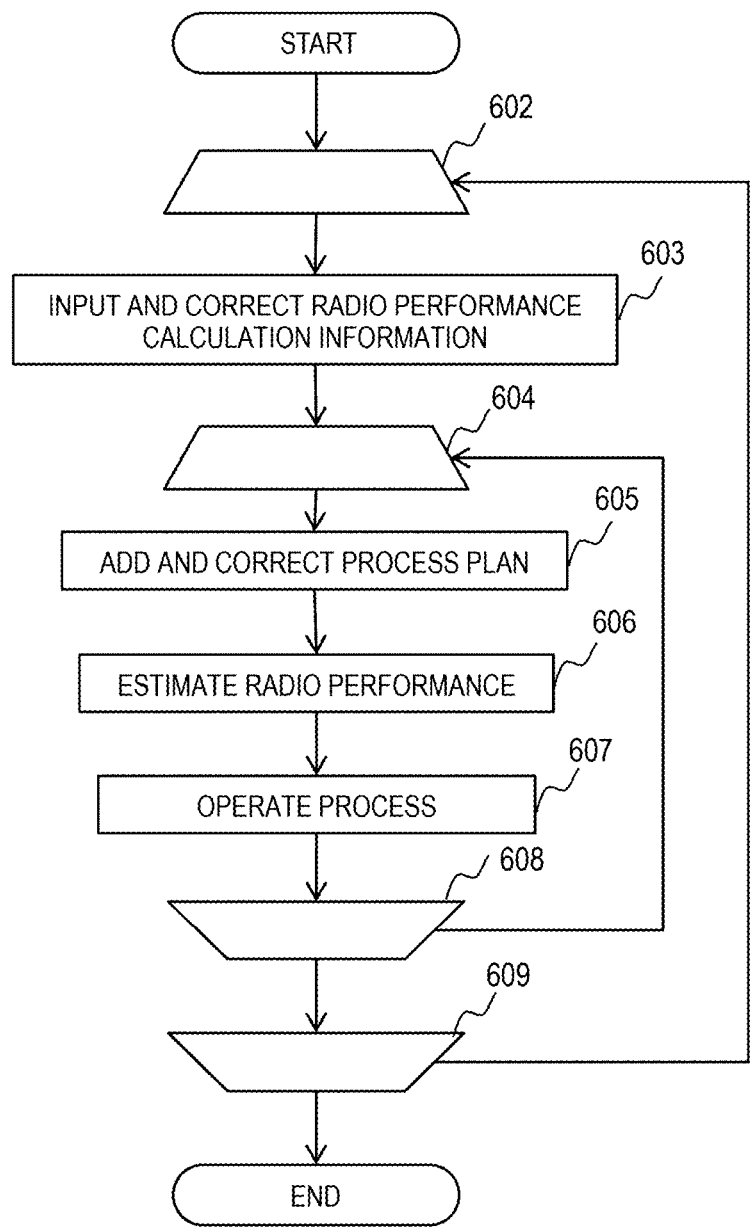

FIG. 8A

| PROCESS | RADIO PERFORMANCE ESTIMATION METHOD |
|---|---|
| PROCESS A | SIMPLE SIMULATION (4)<br>HIGH-ACCURACY SIMULATION (7) |
| PROCESS B | DATABASE QUOTATION (1)<br>SIMPLE SIMULATION (3)<br>HIGH-ACCURACY SIMULATION (6) |
| PROCESS C | HIGH-ACCURACY SIMULATION (7) |

FIRST INTERMEDIATE RESULT TABLE

FIG. 8B

| RADIO PERFORMANCE ESTIMATION METHOD | | | RADIO PERFORMANCE ESTIMATION COMPLETION TIME | | |
|---|---|---|---|---|---|
| PROCESS A | PROCESS B | PROCESS C | PROCESS A | PROCESS B | PROCESS C |
| SIMPLE | DB | HIGH-ACCURACY | 10:00 | 11:00 | 18:00 |
| SIMPLE | SIMPLE | HIGH-ACCURACY | 10:00 | 13:00 | 20:00 |
| SIMPLE | HIGH-ACCURACY | HIGH-ACCURACY | 10:00 | 16:00 | 23:00 |
| HIGH-ACCURACY | DB | HIGH-ACCURACY | 13:00 | 14:00 | 21:00 |
| HIGH-ACCURACY | SIMPLE | HIGH-ACCURACY | 13:00 | 16:00 | 23:00 |
| HIGH-ACCURACY | HIGH-ACCURACY | HIGH-ACCURACY | 13:00 | 19:00 | 26:00 |

SECOND INTERMEDIATE RESULT TABLE

| PROCESS 381 | RADIO PERFORMANCE ESTIMATION METHOD 382 | RADIO PERFORMANCE ESTIMATION RESULT 383 |
|---|---|---|
| PROCESS A | SIMPLE SIMULATION (4) | ATTACHED FILE A |
| PROCESS B | DATABASE QUOTATION (1) | ATTACHED FILE B |
| PROCESS C | HIGH-ACCURACY SIMULATION (7) | LINK C |

RADIO PERFORMANCE ESTIMATION RESULT

PROCESS A
HEAT MAP

FIG. 10

Extraction Condition Table (810)

| APPLICATION (811) | SHIELDING (812) | PARAMETER (813) | CALCULATION EXCLUSION POSSIBILITY CONDITION (814) |
|---|---|---|---|
| APPLICATION 1 | NO | SIZE | EQUAL TO OR HIGHER THAN THRSIZE1 |
| | | DISTANCE | LESS THAN THRDIST1 |
| | YES | | ANY |
| APPLICATION 2 | NO | SIZE | EQUAL TO OR HIGHER THAN THRSIZE2 |
| | | DISTANCE | LESS THAN THRDIST2 |
| | YES | | ANY |
| APPLICATION 3 | NO | SIZE | EQUAL TO OR HIGHER THAN THRSIZE3 |
| | | DISTANCE | LESS THAN THRDIST3 |
| | YES | | ANY |

FIG. 11

Extraction Condition Table (820)

| WIRELESS SYSTEM (821) | SHIELDING (822) | PARAMETER (823) | CALCULATION EXCLUSION POSSIBILITY CONDITION (824) |
|---|---|---|---|
| WIFI | NO | SIZE | EQUAL TO OR HIGHER THAN THRSIZE1 |
| | | DISTANCE | LESS THAN THRDIST1 |
| | YES | | ANY |
| LTE | NO | SIZE | EQUAL TO OR HIGHER THAN THRSIZE2 |
| | | DISTANCE | LESS THAN THRDIST2 |
| | YES | | ANY |
| LOCAL5G | NO | SIZE | EQUAL TO OR HIGHER THAN THRSIZE3 |
| | | DISTANCE | LESS THAN THRDIST3 |
| | YES | | ANY |

RADIO PERFORMANCE CALCULATION INFORMATION

| APPLICATION | REQUIRED POWER (BASE STATION) [dBm] | REQUIRED POWER (TERMINAL) [dBm] |
|---|---|---|
| APPLICATION 1 | - | -70 |
| APPLICATION 2 | -80 | - |
| APPLICATION 3 | -60 | -75 |

APPLICATION AVAILABILITY DETERMINATION TABLE

SYSTEM AND METHOD FOR ESTIMATING RADIO PERFORMANCE OF MANUFACTURING SITE

CLAIM OF PRIORITY

The present application claims priority from Japanese patent application JP 2021-145205 filed on Sep. 7, 2021, the content of which is hereby incorporated by reference into this application.

BACKGROUND OF THE INVENTION

1. Field of the Invention

The present invention relates to a radio performance estimation system at a manufacturing site.

2. Description of the Related Art

In recent years, due to development of communication techniques and analysis techniques, at manufacturing sites such as factories, there are increasing sites where wireless communication is required for proceeding processes or sites where assistance by wireless communication is used. Various types of application programs (hereinafter, also simply referred to as applications) using the wireless communication have been studied. As an example, at a manufacturing site such as a factory, process progress information and log information such as presence or absence of troubles are wirelessly collected from sensors or the like installed in various places. In another example, a moving image of a manufacturing site is distributed in real time by a camera, and thus a production manager or a skilled worker can visually check progress of a process or issue an instruction to a person in charge of the site from a remote place. In another example, a machine such as a robot arm is remotely controlled.

These applications can also perform processing by wired communication. However, it is expected that the number of devices such as sensors will increase in the future, and at a manufacturing site for high-mix low-volume production, additional installation of devices or movement of installation locations may frequently occur due to changes in processes. In this case, with wired communication, wire rerouting work occurs every time the process is changed, which is difficult to deal with. Therefore, in the future, wireless communication is expected to become the mainstream at the manufacturing site.

It is possible to avoid the wire rerouting work accompanying the process change (for example, production of a certain product is completed and production of a next product is started) by the wireless communication. However, when a device to be installed is added or a position of the device is changed in accordance with the process change, wireless communication performance also changes.

Specifically, when a device is placed between a transmitter and a receiver, a radio wave used in the wireless communication is attenuated by shielding, or the radio wave is reflected or scattered by a device installed in the vicinity of the transmitter or the receiver. Therefore, a radio wave condition in the manufacturing site changes due to addition, removal, and positional changes of devices, and radio performance also changes.

Various propagation simulation techniques for estimating radio performance not only at a manufacturing site but also at a workplace (factory, office, or the like) using wireless communication have already been developed and commercialized. JP-T-2019-509685 discloses a method of combining a mining plan in a mine and a network plan.

When a process is changed at a manufacturing site, a radio wave condition in the manufacturing site changes due to installation, removal, and positional changes of devices, and thus radio performance changes. At this time, even if various applications operate by wireless communication without any problem in a current process, the applications may not operate as expected by wireless communication in a next process due to the change in the radio performance. As a result, although the next process is started, the applications required in the process may not operate and the process may stop, resulting in a decrease in an operation rate of a production site.

In order to avoid such a problem, it is useful to estimate the radio performance in accordance with a future plan by certain methods. Various propagation simulators for estimating the radio performance are already known. The radio wave propagation simulation is a technique for estimating the radio performance, and the following problems still remain at manufacturing sites. For example, there are a large number of small-scale manufacturing sites, and a skilled radio technician who can master the propagation simulation is not always assigned to each site. A person in charge of a site who does not have radio knowledge cannot master the propagation simulation, and thus correct radio performance estimation may not be performed, or it may take a long time to set the propagation simulation.

SUMMARY OF THE INVENTION

The present invention has been made in consideration of the above-described problem, and an object thereof is to support a manager or a person in charge of a site whose radio knowledge is not sufficient at a manufacturing site in estimating radio performance in each production process.

An aspect of the present invention is a system for estimating radio performance of a manufacturing site, the system including: one or more storage devices; and one or more arithmetic devices, in which the one or more storage devices store: process information including information on one or more processes before starting at the manufacturing site; and management information that manages one or more radio performance estimation methods usable for each of a plurality of applications and information for determining a processing time of each of the one or more radio performance estimation methods, the process information includes information on one or more applications used in each process of the one or more processes and information on a time associated with each process, and the one or more arithmetic devices refer to the process information and the management information so as to determine one or more radio performance estimation methods usable in each process, and refer to the process information and the management information so as to select a wireless communication method, through which radio performance estimation processing is completed by a time associated with each process, from the one or more radio performance estimation methods usable in each process.

According to the aspect of the present invention, it is possible to support the manager or the person in charge of the site in estimating radio performance in each production process.

Problems, configurations, and effects other than those described above will be clarified by the following description of embodiments.

BRIEF DESCRIPTION OF THE DRAWINGS

FIG. 4 is a diagram showing a process plan.

FIG. 5A is a diagram showing radio performance calculation information.

FIG. 5B is a diagram of a performance estimation method table.

FIG. 5C is a diagram of a propagation simulation time table.

FIG. 5D is a diagram of an extraction condition table.

FIG. 5E is a diagram of a material table.

FIG. 6 is a flowchart of a life cycle of all operations according to an embodiment of the present specification.

FIG. 8A is a diagram of an intermediate result in the flowchart of FIG. 7 of a radio performance calculation unit.

FIG. 8B is a diagram of an intermediate result in the flowchart of FIG. 7 of the radio performance calculation unit.

FIG. 10 is a diagram of an extraction condition table according to a second embodiment.

FIG. 11 is a diagram of an extraction condition table according to a third embodiment.

DESCRIPTION OF THE PREFERRED EMBODIMENTS

Figure 1:
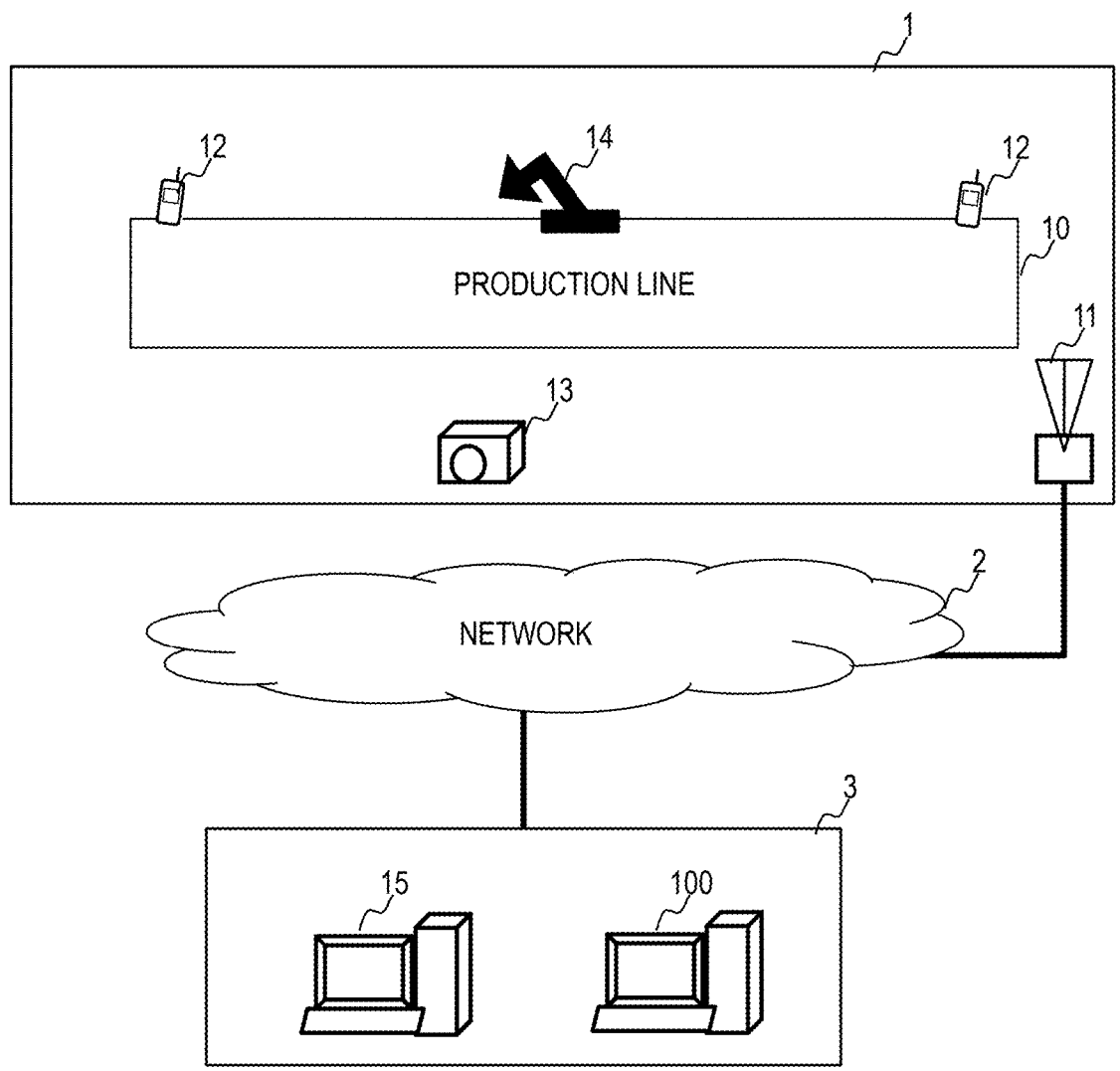
FIG. 1 is a conceptual diagram of a manufacturing site assumed in a first embodiment.

Hereinafter, several embodiments of the present invention will be described with reference to the drawings. In the following embodiments, description may be divided into a plurality of sections or embodiments if necessary for convenience. Unless otherwise specified, the sections or embodiments are not independent of each other, and have a relation in which one section or embodiment is a modification, detailed description, supplementary description, or the like of a part or all of another section or embodiment. Each of the embodiments may be implemented individually, or may be implemented in combination.

In addition, in the following embodiments, when a number and the like (including the number, a numerical value, an amount, a range, and the like) of an element is referred to, the number and the like are not limited to specific numbers, and may be equal to or greater than or equal to or less than the specific numbers, unless otherwise specified or clearly limited to a specific number in principle.

Further, in the following embodiments, it is needless to say that elements (including element steps and the like) are not always indispensable unless otherwise specified or except the case where the elements are apparently indispensable in principle.

Similarly, in the following embodiments, when a shape, a positional relationship, or the like of an element or the like is referred to, it is assumed that those substantially approximate or similar to the shape or the like are included, unless otherwise specified or except the case where it is considered that the shape or the like is obviously not right in principle. The same applies to numerical values and ranges.

In the following description, information may be described by an expression such as an "xxx table", and the information may be data of any structure. In the following description, a configuration of each table is an example, one table may be divided into two or more tables, and all or a part of the two or more tables may be one table. In addition, in the following description, a function may be described by an expression such as an "xxx unit", and the function may be implemented by executing one or more computer programs.

Hereinafter, a radio performance estimation system at a manufacturing site will be described. The radio performance estimation system facilitates preliminary radio performance estimation at the manufacturing site where an application program using wireless communication is used in a production process of a product, a component, or the like.

There are a large number of small-scale manufacturing sites, and a skilled radio technician who can master a propagation simulation is not always assigned to each site. A person in charge of a site who does not have radio knowledge cannot master the propagation simulation, and thus correct radio performance estimation may not be performed, or it may take a long time to set the propagation simulation. In addition, the propagation simulation may take a long time, and as a result, results may not be obtained by a required time.

A radio performance estimation system according to an embodiment of the present specification adjusts estimation accuracy of radio performance estimation in accordance with a process plan or application information. Accordingly, a radio performance estimation time can be accommodated between processes. As a result, it is possible to select a radio estimation method according to the processes. In addition, in the embodiment of the present specification, the radio performance estimation system can reduce a frequency of occurrence of a situation in which the radio performance estimation is not completed before the processes are started.

In the radio performance estimation system according to the embodiment of the present specification, information to be input by a user is only information on installed devices and information on the process plan, and no radio knowledge is required. Therefore, it is not necessary to deploy radio technicians to all production sites. As a result, prior verification before the processes are start and radio setting correction as necessary can be performed, and thus an operation rate of a site can be improved.

First Embodiment

In the present embodiment, an example will be described in which radio performance for three production processes is estimated before starting at one manufacturing site. This manufacturing site is a manufacturing site for high-mix low-volume production, and production work is performed as an individual process for each product (good, component).

In different processes, different installed objects such as devices and equipment are required around a production line. In the present specification, such devices and equipment are referred to as the installed objects. The installed objects may also be workers who work at predetermined positions beside the line. In addition, in order to perform or support product production in each process, an application program using wireless communication is used. Hereinafter, the application program is also simply referred to as an application.

Different applications may be used for the different processes. Only one application may be used for a certain process, while a plurality of applications may be used for another process. Examples of the applications to be used are considered to be various depending on the manufacturing site, and in the present embodiment, the following three types of applications are assumed.

The first type of applications is a log collection application. The log collection application collects a log file such as an operation status and a production progress status of each device from a sensor or the like. The log file is, for example, a text file.

The second type of applications is an application that captures a situation at the manufacturing site with a camera by moving image streaming and displays the captured situation by streaming in real time on a monitor at a remote location. The third type of applications is an application for remotely operating a manufacturing device such as a robot arm installed at the manufacturing site under remote control.

FIG. 1 is a conceptual diagram of a manufacturing site premised on the above configuration. In a manufacturing site 1, there is a production line 10 on which production work is performed, and devices that implement the above-described applications are disposed around the production line 10. Specifically, sensors 12 which are log collection terminals, a camera 13 for real-time moving image streaming, and a robot arm 14 that is remotely controlled are installed.

Such devices 12, 13, and 14 also have functions as wireless communication terminals, perform wireless communication with a base station 11 for wireless communication, and exchange data with a remote server 15 installed in a management room 3 via a network 2. Such devices that perform wireless communication are wireless communication devices. A management system is installed in the management room 3, and the management system includes the server 15 and a radio performance estimation system 100.

For example, logs collected by the sensor 12 are stored in a storage in the remote server 15. Images captured by the camera 13 are displayed on a monitor of the remote server 15 in real time. The robot arm 14 performs work on the production line 10 in accordance with an instruction from the remote server 15. It should be noted that a plurality of the production lines 10, devices 12, 13, and 14, and base stations 11 may be provided. The management room 3 may be located in the same site (for example, the same factory) as the manufacturing site or in a different site, and necessary functions may be implemented on the cloud.

Figure 2A:
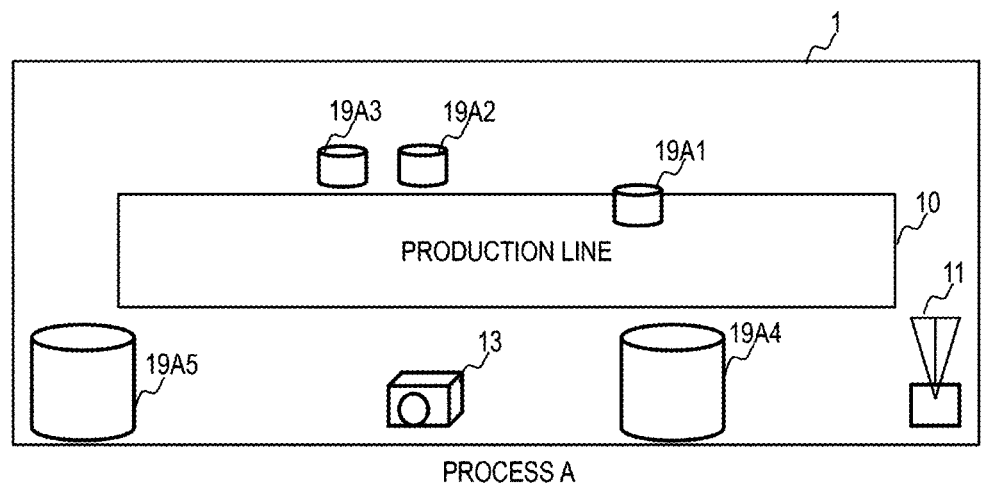
FIG. 2A is an arrangement diagram of a manufacturing site in a process A.
Figure 2B:
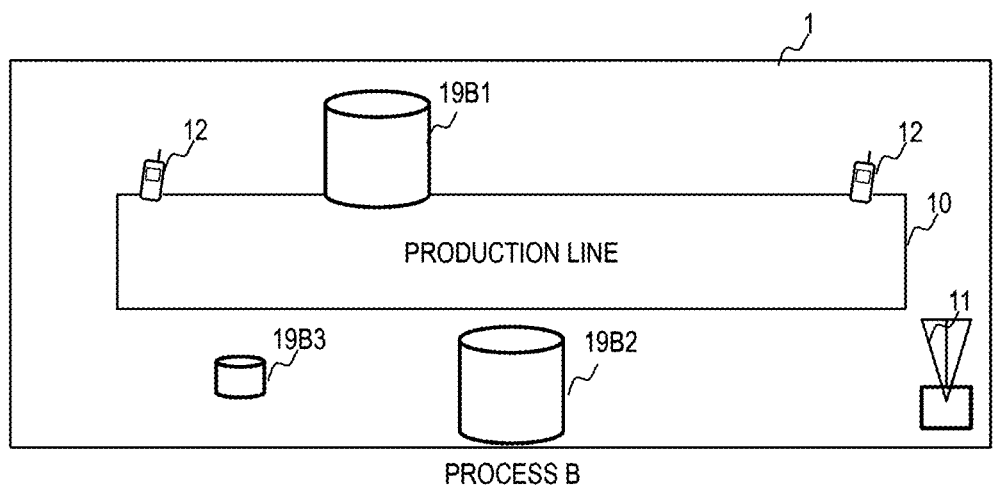
FIG. 2B is an arrangement diagram of a manufacturing site in a process B.
Figure 2C:
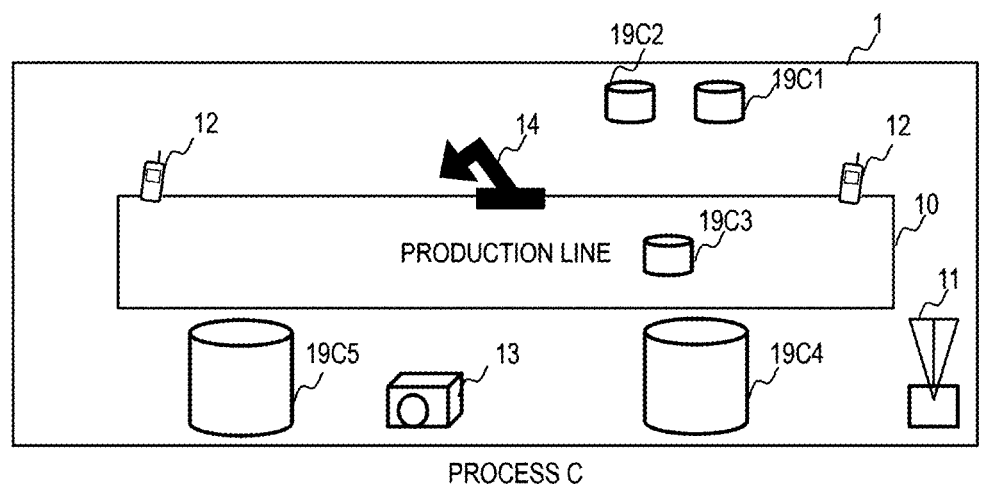
FIG. 2C is an arrangement diagram of a manufacturing site in a process C.

FIGS. 2A, 2B, and 2C respectively show arrangement diagrams of the devices in the three processes before starting at the manufacturing site 1. It is assumed that the three processes, namely a process A, a process B, and a process C, are executed in this order at the manufacturing site 1.

FIG. 2A shows an arrangement diagram of the devices at the manufacturing site 1 in the process A. In the process A, the applications for log collection and remote control are not used. The sensor and the robot arm are not arranged, and only the camera 13 performs wireless communication with the base station 11. Further, installed objects 19A1 to 19A5, which are devices, components, and the like that do not perform wireless communication and are necessary for the process A, are also installed in a manufacturing site 1A.

FIG. 2B shows an arrangement diagram of devices at the manufacturing site 1 in the process B. In the process B, the applications for real-time streaming of moving images and remote control are not used. The camera and the robot arm are not arranged, and only the sensors 12 perform wireless communication with the base station 11. Further, installed objects 19B1 to 19B3, which are devices, components, and the like that do not perform wireless communication and are necessary for the process B, are also installed in a manufacturing site 1B.

FIG. 2C shows an arrangement diagram of devices at the manufacturing site 1 in the process C. In the process C, all of the three types of applications for log collection, real-time streaming of moving images, and remote control are used. All of the sensors 12, the camera 13, and the robot arm 14 perform wireless communication with the base station 11. Further, installed objects 19C1 to 19C5, which are devices, components, and the like that do not perform wireless communication and are necessary for the process C, are also installed in a manufacturing site 1C.

For the manufacturing site 1, the radio performance estimation system 100 performs radio performance estimation in advance before the processes are started. By performing the radio performance estimation in advance, it is possible to take measures such as changing radio setting, changing an arrangement of the installed objects, or changing a schedule of the process before the processes are started. Accordingly, it is possible to avoid a situation in which the radio performance after the processes are started is worse than expected and the applications described above do not operate as desired. As a result, an operation rate of the entire manufacturing site can be improved.

Figure 3:
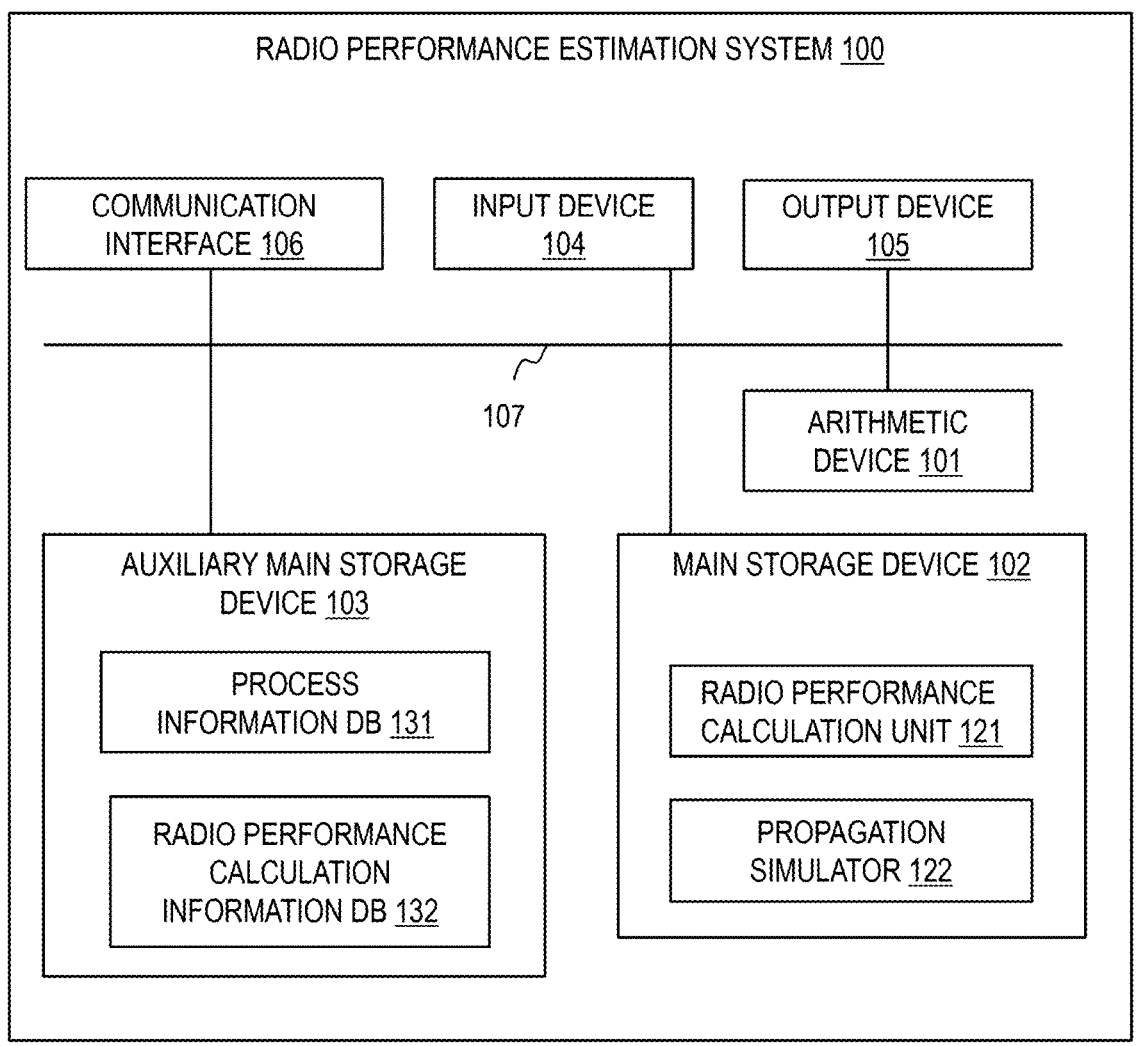
FIG. 3 is a functional block diagram of a radio performance estimation system.

FIG. 3 is a block diagram schematically showing a configuration example of the radio performance estimation system 100. The radio performance estimation system 100 includes an arithmetic e 101 having arithmetic performance, and a main storage device 102 that provides a storage area that stores a program to be executed by the arithmetic device 101 and data to be processed. The arithmetic device 101 is, for example, a CPU including one or a plurality of cores, and the main storage device 102 is, for example, a RAM including a volatile storage area.

The radio performance estimation system 100 further includes a communication interface 106 that performs data communication with another computer device including the remote server 15 or an external storage device, and an auxiliary storage device 103 that provides a nonvolatile storage area using a hard disk drive (HDD), a flash memory, or the like. In addition, the radio performance estimation system 100 includes an input device 104 that receives an operation from a user, and an output device 105 that presents an output result in each process to the user. The input device 104 includes, for example, a keyboard and a mouse, and the output device 105 includes, for example, a monitor and a printer. Such elements of the radio performance estimation system 100 can communicate with each other via an internal bus 107.

In FIG. 3, the main storage device 102 stores programs of a radio performance calculation unit 121, a propagation simulator 122, and the like. The program to be executed by the arithmetic device 101 and the data to be processed are loaded, for example, from the auxiliary storage device 103 onto the main storage device 102. The auxiliary storage device 103 stores a process information database (DB) 131 and a radio performance calculation information database 132.

The radio performance estimation system 100 may be a physical computer system (one or more physical computers) or a system constructed on a calculation resource group (a plurality of calculation resources) such as a cloud infrastructure. The radio performance estimation system 100 may be a mobile device such as a smartphone or a tablet. The computer system or the calculation resource group includes one or more interface devices, one or more storage devices (including, for example, a main storage device and an auxiliary storage device), and one or more arithmetic devices.

When a function is implemented by executing a program by an arithmetic device, the function may be at least a part of the arithmetic device since predetermined processing is appropriately performed by using a storage device and/or an interface device. Processing described with the function as a subject may be processing performed by an arithmetic device or a system including a processor thereof.

The program may be installed from a program source. The program source may be, for example, a program distribution computer or a computer-readable storage medium (for example, a computer-readable non-transitory storage medium). A description for each function is an example, and a plurality of functions may be combined into one function, or one function may be divided into a plurality of functions.

An outline of software components shown in FIG. 3 will be described below. The process information database 131 stores process plan information received via the communication interface 106 or the input device 104. Details of the process information will be described later. The radio performance calculation unit 121 calculates radio performance in each process by using the propagation simulator 122 and radio performance calculation information in the radio performance calculation information database 132 based on the process information stored by the process information database 131.

The propagation simulator 122 can use any existing technique such as a ray tracing method. The propagation simulator 122 performs a propagation simulation of radio waves in the manufacturing site 1 in each process in accordance with an instruction from the radio performance calculation unit 121, and calculates the radio performance. The radio performance calculation information database 132 is management information that stores the radio performance calculation information such as parameters related to radio used by the propagation simulator 122. Details of the radio performance calculation information will be described later.

FIG. 4 is a diagram showing an example of a process plan 200 stored in the process information database 131. As shown in FIG. 4, the process plan 200 can store information on each process before starting to be executed in the future in a form of a table. A production process column 201 indicates information common to all processes and information unique to each specific process. In FIG. 4, as an example, information 211A related to the process A, information 211B related to the process B, and information 211C related to the process C are shown. In addition, information 210 common to all the processes is shown.

The information related to each process includes production plan information on the process and application information necessary for the process. The production plan information includes a product column 202, an installed object column 203, a position column 204, a size column 205, a material column 206, a start time column 207, and an end time column 208. The application information includes a required application column 209.

The product column 202 indicates a product produced by the process. The installed object column 203 indicates a name (type) of each installed object (individual) such as a device and a component required in the process. The installed object column 203 further indicates terminals that perform wireless communication. For example, in the process A, the camera is a wireless terminal, in the process B, the sensor is a wireless terminal, and in the process C, the camera, the sensor, and the robot arm are wireless terminals. The wireless terminal and the base station are wireless devices.

The position column 204 indicates a position of the installed object. The size column 205 indicates a size of the installed object. The material column 206 indicates a material of the installed object. The start time column 207 indicates a scheduled start time of the process. The end time column 208 indicates a scheduled end time of the process.

The information on each process includes information on positions, sizes, and materials of the sensors 12, the camera 13, the robot arm 14, and the like necessary for the applications described above. For example, in the process A, there are seven installed objects including the camera, a component A1, a component A2, a component A3, a device A4, and a device A5 in addition to the base station.

The common information 210 indicates only information on the installed object, that is, the installed object column 203, the position column 204, the size column 205, and the material column 206. The installed object indicated by the common information 210 is used in all the processes. In the example of FIG. 4, a position, a size, and a material of the base station 11 are included in the common information 210.

The required application column 209 stores a list of applications that perform wireless communication required in each process. In the example of FIG. 4, the moving image application is shown for the process A. The log collection application is shown for the process B. Three applications including the log collection, the moving image, and the remote control are shown for the process C.

The example indicated by the process information through the present specification is an example for carrying out the embodiment, and does not necessarily correspond to a process at an actual manufacturing site. Only a part of the information indicated in the process plan 200 may be included, or other information may also be included. For example, the information on the size and the material of the installed object and the information on the end time may be omitted.

FIG. 5A shows an example of radio performance calculation information 500 stored in the radio performance calculation information database 132. The radio performance calculation information 500 includes a plurality of types of data. Specifically, the radio performance calculation information 500 includes a performance estimation method table 510, a propagation simulation time table 520, an extraction condition table 530, a material table 540, and a past performance evaluation database 550.

FIG. 5B shows a configuration example of the performance estimation method table 510. The performance estimation method table 510 indicates which performance estimation method is applicable to each application. The performance estimation method table 510 includes an application column 511 and a performance estimation method column 512. In this example, as a method of calculating the radio performance by the radio performance calculation unit 121, a simulation using the propagation simulator 122 and a database quotation in which an evaluation result in the same process in the past is quoted are registered.

In this example, the database quotation can be used when the same process is executed in the past. The same process is a process of manufacturing the same object. The database quotation can be used between processes in which products indicated in the product column 202 in the process plan 200 are the same. In a case where similar product classification information is prepared and there is no past analysis result of the same product, an analysis result of a similar product may be used.

In this example, a plurality of types of simulations are registered. One is a high-accuracy simulation, and the other is a simple simulation. The high-accuracy simulation enables a propagation simulation with higher accuracy than the simple simulation, and requires more calculation processing. That is, a processing time of the high-accuracy simulation required by a computer system is longer than a processing time required of the simple simulation by the same computer system.

In one embodiment of the present specification, the high-accuracy simulation takes in all the installed objects described in the process plan 200 and executes the propagation simulation, while the simple simulation takes in a part of the installed objects extracted from all the installed objects described in the process plan 200 and executes the propagation simulation. Although accuracy of the simple simulation is low, a calculation time can be shortened. By preparing the simulation methods with different accuracy based on the number of installed objects, it is possible to more appropriately achieve both processing time and simulation performance in accordance with conditions of the process.

It should be noted that three or more types of simulation methods may be set and registered. In addition, simulation methods with different accuracy based on different algorithms may be prepared instead of being based on the number of installed objects to be referred to in the simulation.

In the example of FIG. 5B, all of the database quotation, the simple simulation, and the high-accuracy simulation are set and registered for the log collection application. A data amount of the log collection is small, and there is no need for a strict delay or the like in the network. Therefore, it is considered that radio performance estimation with high accuracy is unnecessary, and it is set that any method may be used.

For the moving image, the simple simulation and the high-accuracy simulation are set and registered. The database quotation is considered to have a problem in accuracy, and thus either the simple simulation or the high-accuracy simulation is required. For the remote control, only the high-accuracy simulation is assigned. It is considered that a delay request is extremely strict for the remote control and accurate radio performance estimation is necessary, and thus the high-accuracy simulation is essential. Such radio performance estimation methods will be described later.

FIG. 5C shows a configuration example of the propagation simulation time table 520. The propagation simulation time table 520 is information for determining a processing time of each radio performance estimation method. The propagation simulation time table 520 indicates correspondence between the number of installed objects to be taken in and the calculation time of the propagation simulation when the above-described propagation simulation is performed.

The propagation simulation time table 520 includes a number of installed objects column 521 and a propagation simulation time column 522. Values in the propagation simulation time table 520 may be determined by a radio technician based on an empirical rule. The propagation simulation time table 520 may be created by the system based on past records. Here, it is assumed that the propagation simulation time table 520 is created by the radio technician. By defining an estimated required time in relation to the number of installed objects, it is possible to estimate the processing time more accurately.

A required time of the database quotation method may be a constant set in advance. In one example, the required time of the database quotation method is shorter than that of any propagation simulation. In a configuration in which propagation simulators of algorithms having different processing systems and processing times are prepared, information on each processing time may be prepared, and the information may be irrelevant to the number of installed objects.

FIG. 5D shows a configuration example of the extraction condition table 530. The extraction condition table 530 indicates conditions used for determining which installed object is to be extracted when the installed object to be taken into the simulation is extracted in the above-described simple simulation. It is desirable to extract an installed object having a large influence on the radio performance. The extraction condition table 530 includes a shielding column 531, a parameter column 532, and a calculation exclusion possibility condition column 533.

The shielding column 531 indicates a condition as to whether a target installed object is at a position at which radio waves between the base station 11 and the wireless terminal (a device that performs wireless communication, such as the sensors 12, the camera 13, and the robot arm 14) are shielded. For example, when a virtual line connecting positions of the wireless terminal and the base station 11 indicated by the process plan 200 passes through the installed object, it is determined that the installed object shields the radio waves between the base station 11 and the wireless terminal.

The parameter column 532 indicates parameters including conditions of calculation exclusion determination. In the example of FIG. 5D, a size of the installed object and a distance between the installed object and the base station or the wireless terminal are set as condition parameters. The calculation exclusion possibility condition column 533 indicates a condition under which exclusion from the simulation is denied, that is, a condition extracted for the simulation.

In an example of an extraction rule shown in FIG. 5D, when the following conditions are satisfied for the shielding, the size, and the distance, the target installed object is extracted for the simulation. The target installed object is not located at the position at which the radio waves between the base station and the wireless terminal are shielded ("No" in the shielding column 531).

Further, the size of the target installed object is equal to or higher than a threshold value ThrSize. The size may be, for example, a total value of vertical and horizontal heights or a maximum value of the vertical and horizontal heights. Further, the distance between the target installed object and the base station or the wireless terminal is equal to or less than a threshold value ThrDist. The distance may be, for example, a minimum value of the distance from the base station and the wireless terminal to the target installed object. The condition of the distance may be whether a target installed object is present in an ellipse having coordinates of the base station and the wireless terminal serving as focal points.

When the target installed object is located at the position at which the radio waves between the base station and the wireless terminal are shielded, the target installed object is extracted for the simulation regardless of other conditions.

The extraction condition table may not include all the conditions described above. For example, the size condition may be omitted, and only the condition based on the position of the installed object may be defined, or the distance condition may be omitted. A condition different from the conditions of the distance and the size, for example, a material condition may be added. In a case where the process plan does not include the information on the size of the installed object, the conditions of the shielding and the distance may be determined only based on the position information.

FIG. 5E shows a configuration example of the material table 540. The material table 540 indicates information on reflectance and dielectric constant of the installed object used in the propagation simulation. It is assumed that such information is known information and is set and registered in advance.

The past performance evaluation database 550 accumulates an estimation result of a process for which radio performance estimation has already been executed by a certain method. A result calculated by another system may be registered in the past performance evaluation database 550 by the radio technician, or a result output by the radio performance calculation unit 121 may be directly registered. A format of the past performance evaluation database 550 may be the same as an output of the radio performance calculation unit 121.

FIG. 6 is a flowchart of a cycle of all operations according to the embodiment of the present specification. When the management system is introduced, a maintenance cycle (602 to 609) performed by the radio technician is periodically started thereafter. In the maintenance, the various tables of the radio performance calculation information 500 are added or corrected (603). The maintenance performed by the radio technician is, for example, on the order of several months, which is longer than a site operation cycle (604 to 608).

Thereafter, the site operation cycle (604 to 608) is started. A site manager adds and corrects the process plan 200 in accordance with a production plan, a work procedure manual, or the like (605). The radio performance calculation unit 121 performs the radio performance estimation based on the radio performance calculation information 500 and the process plan 200 (606). The remote server 15 operates the process by using the estimation result (607). The site operation cycle (604 to 608) is considered to be relatively short, and is, for example, on the order of one day.

Figure 7:
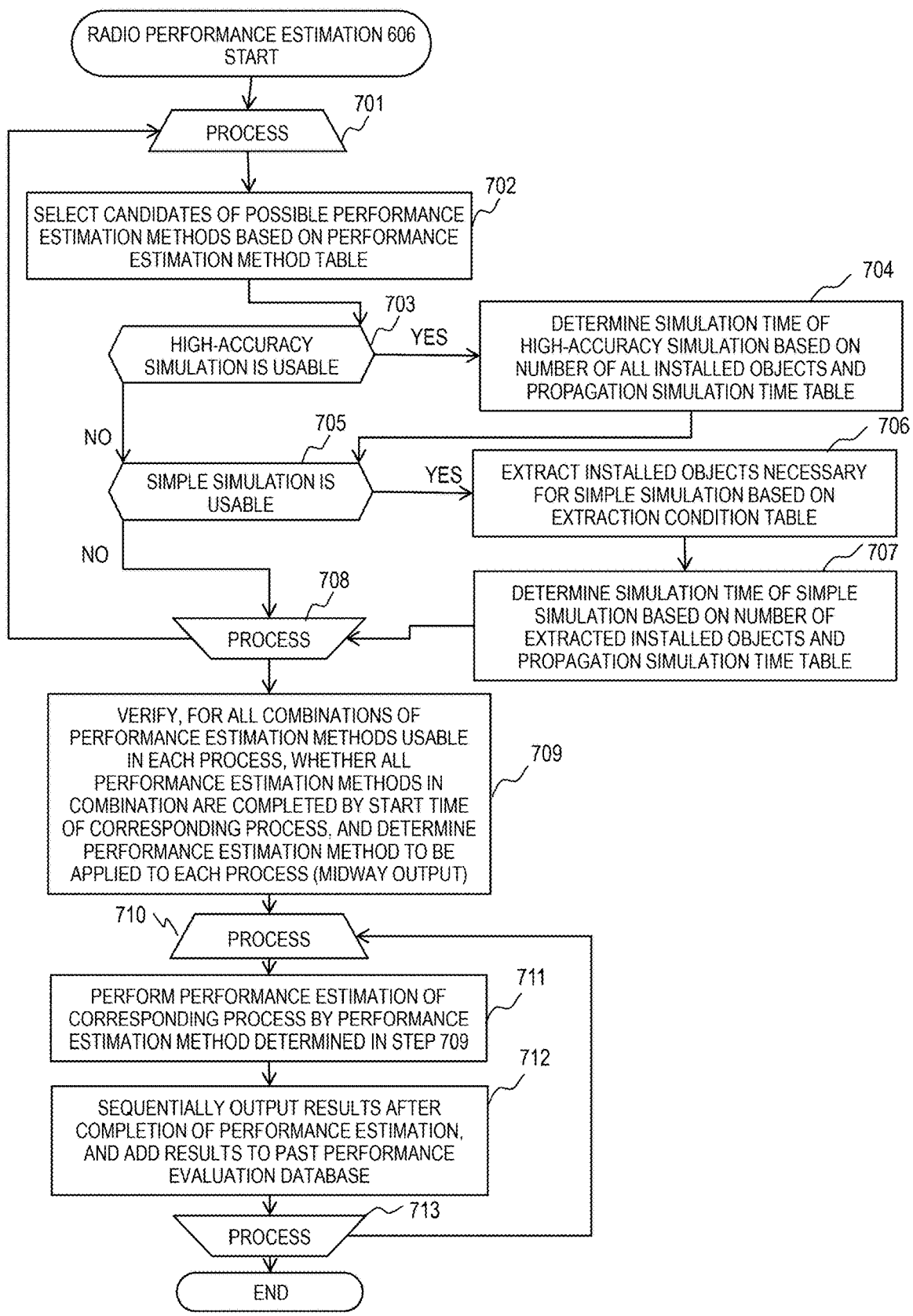
FIG. 7 is a diagram showing a flowchart of steps of performing radio performance calculation.

FIG. 7 shows an internal flowchart of the step 606 in which the radio performance calculation unit 121 performs the radio performance estimation following the step 605 of adding and correcting the process plan 200 shown in FIG. 6. Hereinafter, this flowchart will be described with reference to the example of the process plan 200 shown in FIG. 4.

After the step 605 of adding and correcting the process plan 200, the radio performance calculation unit 121 executes the following processing on all the processes registered in the process plan 200 or a part of the processes scheduled to start most recently.

First, the radio performance calculation unit 121 executes a cycle indicated by steps 701 to 708 for each process. Specifically, the radio performance calculation unit 121 selects candidates of the radio performance estimation method applicable to the process based on the performance estimation method table 510 (702). When a plurality of applications are executed in the process, a radio performance estimation method common to all the applications can be selected as a candidate.

When the high-accuracy simulation is included in the candidates (703: YES), the radio performance calculation unit 121 determines a simulation time of the high-accuracy simulation based on the number of all the installed objects described in the process plan 200 and the propagation simulation time table 520 (704).

When the simple simulation is included in the applicable candidates of the radio performance estimation method (705: YES), the radio performance calculation unit 121 extracts the installed objects necessary for the simple simulation based on the extraction condition table 530 (706). The radio performance calculation unit 121 determines a simulation time of the simple simulation based on the number of extracted installed objects and the propagation simulation time table 520 (707).

A first intermediate result table 350 of FIG. 8A shows an intermediate result obtained by applying the steps up to this point to each process described in the process plan 200. Specifically, the first intermediate result table 350 includes a process column 351 and a radio performance estimation method column 352. The process column 351 indicates each process serving as an estimation target. The radio performance estimation method column 352 indicates radio performance estimation method candidates for each process. In the radio performance estimation method column 352, numbers in parentheses each represent a time required for each simulation. In this example, the required time is represented by a value rounded up to the nearest hour. The simulation required time is acquired from the propagation simulation time table 520 as a result of the steps 703 to 707.

For example, since the moving image application is used in the process A, the simple simulation and the high-accuracy simulation are selected as the candidates of the performance estimation method based on the performance estimation method table 510, and the database quotation is not applicable. The simple simulation of the process A requires 4 hours, and the high-accuracy simulation requires 7 hours.

Meanwhile, since only the log collection application is used in the process B, the database quotation is also applicable. A time required for the database quotation is 1 hour. As shown in the process plan 200, the number of installed objects in the process B is less than that in the process A. Therefore, even in the same high-accuracy simulation, a time required for the process B is shorter. Since the process C requires the remote control application, the database quotation and the simple simulation are not applicable. The high-accuracy simulation is necessarily applied.

Next, the radio performance calculation unit 121 verifies, for all combinations of the performance estimation methods usable in each process, whether all the performance estimation methods in the combination are completed by a start time of the corresponding process, and determines the performance estimation method to be applied to each process (709). As described above, there are two, three, and one candidate of the radio performance estimation method for the processes A, B, and C, respectively. The total number of combinations is six. The radio performance calculation unit 121 calculates when radio performance estimation for the process A, the process B, and the process C will be completed for each combination.

In the embodiment of the present specification, estimation processing performed by the radio performance calculation unit 121 on the respective processes is sequentially executed. For example, the radio performance calculation unit 121 determines an estimation processing completion time for each process on an assumption that the pieces of estimation processing are sequentially executed from a process having an earliest start time. In another embodiment of the present specification, pieces of radio performance estimation processing of a plurality of processes may be simultaneously executed by different computers or arithmetic cores. The radio performance calculation unit 121 can determine the estimation process completion time of each process by referring to the number of estimation processes that can be simultaneously executed and information on a time required for each piece of estimation processing.

As an example of an operation in which the pieces of radio performance estimation processing are executed simultaneously, in processing of "performing the processing of step 709 on the first intermediate result table 350 to obtain a second intermediate result table 360" to be described later, the second intermediate result table 360 can be additionally obtained in a case where the process A and the process B are sequentially processed by the same computer and only the process C is simultaneously processed by another computer. Further, an operation is conceivable in which the second intermediate result table is obtained for other combinations such as a case where only the process A is processed by one computer and the processes B and C are sequentially processed by another computer, and options for determining a final radio performance estimation method are increased. In the following description, it is assumed that the processes are sequentially selected and the pieces of radio performance estimation processing are sequentially executed.

The second intermediate result table 360 of FIG. 8B shows a result obtained by performing the processing of step 709 on the first intermediate result table 350. Here, it is assumed that the radio performance estimation processing is started at 6:00, and it is shown when radio performance calculation of each process will be completed for each combination of the radio performance estimation methods based on the time required for each radio performance estimation method of each process in the first intermediate result table 350.

Specifically, the second intermediate result table 360 includes a radio performance estimation method column 361 and a radio performance estimation completion time column 362. The radio performance estimation method column 361 indicates the combinations of the radio performance estimation methods for each process. The radio performance estimation completion time column 362 indicates an expected time when the radio performance estimation processing on each process is completed for each combination of the radio performance estimation methods.

Among these records, only a record 365 indicates that the radio performance estimation is completed by start times of the processes A, B, and C indicated by the process plan 200. In the record 365, the simple simulation (indicated as "simple" in the drawing) is applied to the process A, the database quotation ("DB") is applied to the process B, and the high-accuracy simulation ("high-accuracy") is applied to the process C. The radio performance calculation unit 121 determines a combination indicated by the record 365 as a combination of the radio performance estimation methods to be actually applied.

When there are two or more records (combinations of estimation methods) in which the radio performance estimation is completed by the start times, any one of the combinations is selected based on a preset determination criterion. For example, there are the following three determination criteria.

(1) A combination having the shortest total calculation time required for the radio performance estimation is selected.

(2) A combination having the longest total calculation time required for the radio performance estimation is selected (as a result, a combination of the estimation methods having the highest accuracy within an allowable time is selected).

(3) Selection is performed randomly.

In the embodiment of the present specification, the radio performance calculation unit 121 selects one combination of the radio performance estimation methods in accordance with the determination criterion (2). That is, the combination having the longest total calculation time required for the radio performance estimation is selected. As a result, it is possible to select the combination of the estimation methods having the highest accuracy within the allowable time.

When there is no combination in which the radio performance estimation is completed by the start times, the radio performance calculation unit 121 may shorten the time for the simple simulation b omitting a part of the installed objects from the installed objects extracted by the simple simulation. For example, it is possible to delete an installed object extracted according to a specific condition, or to change the installed object to an installed object obtained by a stricter extraction condition.

Before proceeding to pieces of processing after step 709 in FIG. 7, the radio performance calculation unit 121 may output the determined radio estimation method to a screen of the output device 105. In the example described above, the record 365 of FIG. 8 is selected. The radio performance calculation unit 121 may output a time line (schedule) 370 shown in FIG. 9 to, for example, a monitor.

Figure 9A:
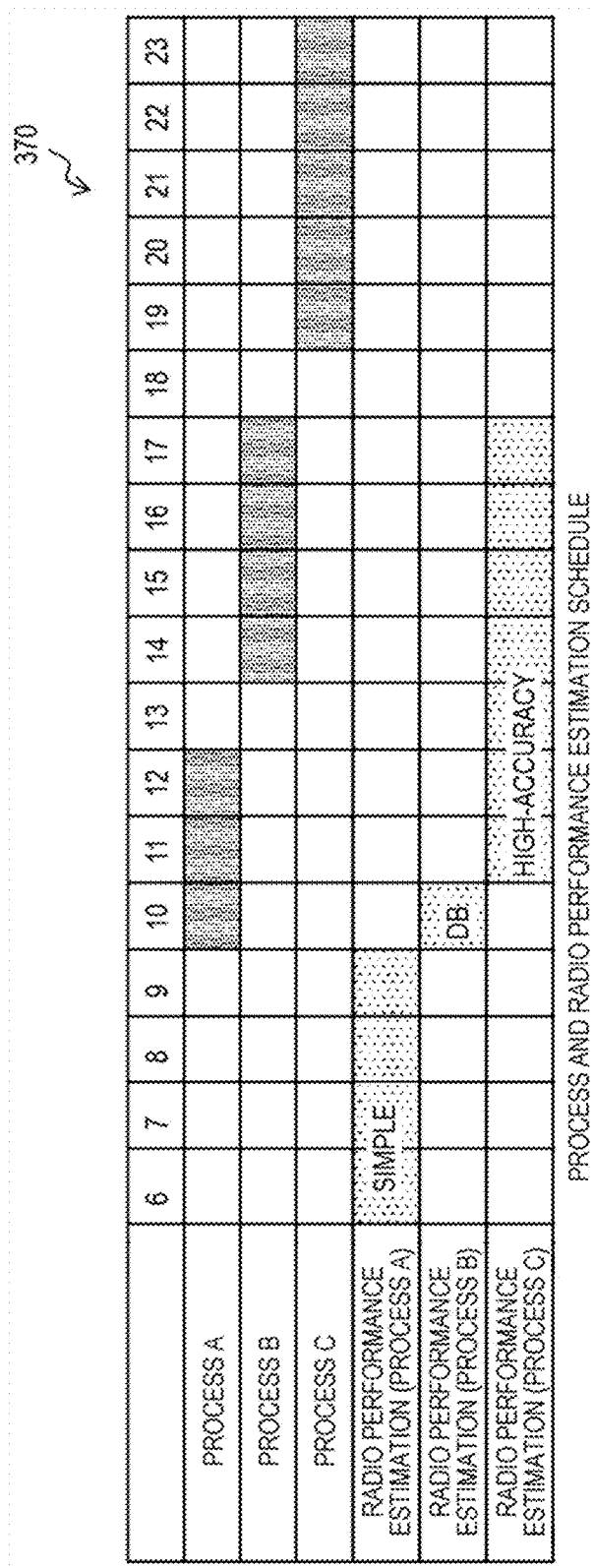
FIG. 9A is a diagram of processes output by the radio performance estimation system and a radio performance estimation schedule.

FIG. 9A shows the schedule 370 of the process A, the process B, and the process C which are targets of the radio performance estimation processing and the radio performance estimation processing for these processes. The radio performance estimation processing on the process A starts at 6:00 and is scheduled to end at 10:00. An estimation method of the process A is the simple simulation. The process A is scheduled to be started at 10:00.

The radio performance estimation processing on the process B starts at 10:00 and is scheduled to end at 11:00. An estimation method of the process B is the database quotation method. The process B is scheduled to be started at 14:00. The radio performance estimation processing on the process C starts at 11:00 and is scheduled to end at 18:00. An estimation method of the process C is the high-accuracy simulation. The process C is scheduled to be started at 19:00. With reference to the displayed schedule 370, the user can confirm that the radio performance estimation processing necessary for each of all the processes can be expected to be completed by the start time of the corresponding process.

Referring back to FIG. 7, next, the radio performance calculation unit 121 sequentially executes a cycle of steps 710 to 713 for each process. Specifically, the radio performance calculation unit 121 performs performance estimation of the corresponding process by the performance estimation method determined in the step 709 (711). When the simple simulation or the high-accuracy simulation is applied as the radio performance estimation method, the radio performance calculation unit 121 uses the propagation simulator 122. The propagation simulation may use the dielectric constant or the reflectance described in the material table 540 in the radio performance calculation information 500 as necessary.

When the database quotation is used as the radio performance estimation method, the radio performance calculation unit 121 quotes an estimation result of the same process from the past performance evaluation database 550 in the radio performance calculation information 500. As soon as the radio performance estimation of one process is completed, the radio performance calculation unit 121 outputs a result thereof (712).

Figures 9B, 9C:
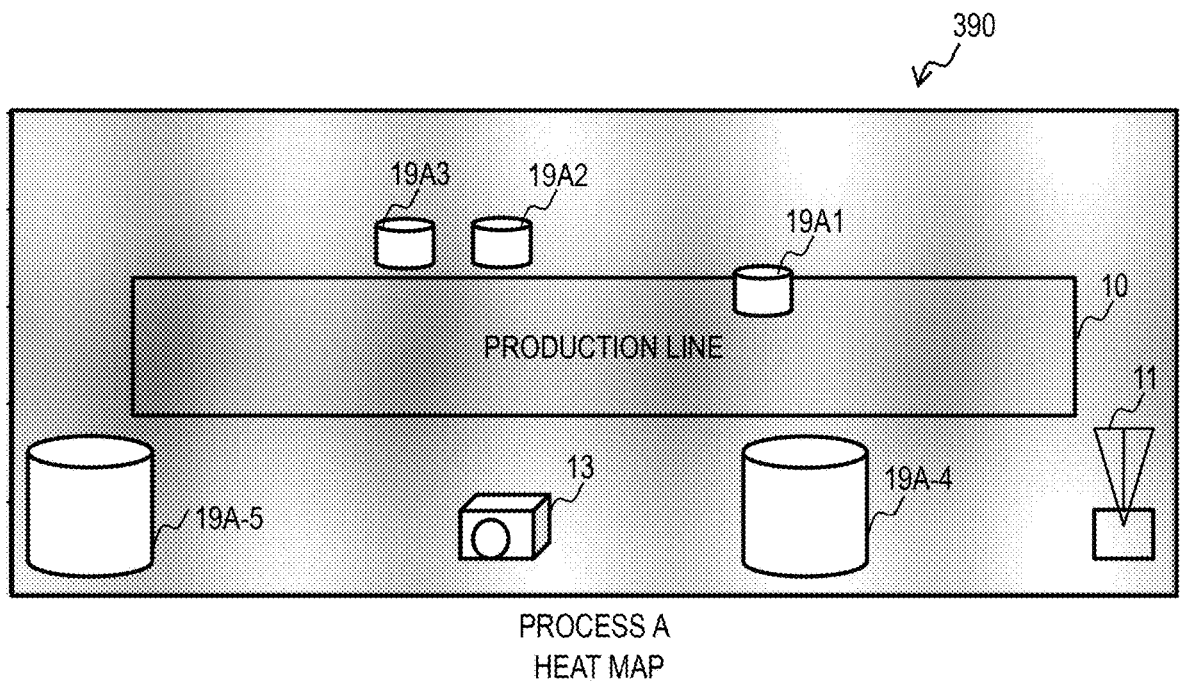
FIG. 9B is a diagram of a radio performance estimation result output by the radio performance estimation system.
FIG. 9C is a diagram of a heat map output by the radio performance estimation system.

FIG. 9B shows an example of the radio performance estimation result of the target process presented to the user. A radio performance estimation result 380 is in a table format, and includes a process column 381, a radio performance method column 382, and a radio performance estimation result column 383. The process column 381 indicates the process serving as the estimation target. The radio performance method column 382 indicates a method used for the radio performance estimation. The radio performance estimation result column 383 indicates the radio performance estimation result. In the example of FIG. 9B, the radio performance estimation result column 383 indicates an attached file indicating the estimation result or a link to the file indicating the estimation result.

The radio performance estimation result column 383 is the same as an output result of a propagation simulation in the related art. For example, the radio performance estimation result is represented by a heat map indicating an intensity of received power at the manufacturing site 1. The heat map is attached as a CSV file or an image file, or a link to such a file is posted.

FIG. 9C shows an example of a heat map of a radio performance calculation result in the process A at the manufacturing site 1. A heat map 390 displays a pattern indicating a radio wave intensity together with the installed objects of the manufacturing site 1. A darker (closer to black) color of the pattern indicates stronger received radio wave intensity, and a lighter (closer to white) color of the pattern indicates weaker received radio wave intensity. It should be noted that a display mode of the heat map is set as desired, and is not limited to the example of FIG. 9C.

Further, the radio performance calculation unit 121 adds the estimation result to the past performance evaluation database 550 in the radio performance calculation information 500, and uses the estimation result to reduce a calculation time in the future. When the simple simulation is used as the radio performance estimation method, the radio performance calculation unit 121 may optionally output information, such as which installed object is extracted to perform the propagation simulation, to the output device 105, or may store the information in the radio performance calculation information 500.

In the present embodiment, it is possible to estimate the radio performance in advance in accordance with a future process plan to be performed at the manufacturing site, and if the radio performance is insufficient, it is possible to take measures in advance, such as changing radio setting or reviewing a schedule. In addition, items input by the site manager in the present system are contents described in a production plan or a work procedure manual, and radio expert knowledge is not necessarily required.

Further, in a case where it takes time to perform the propagation simulation in the radio performance calculation and thus the radio performance estimation cannot be completed before processes are started, a time required for the radio performance estimation is reduced by the simple simulation in which a part of the installed objects are extracted according to characteristics of the applications of the process or quoting the past performance database. As a result, the performance estimation can be completed by a time when the process is started. The wireless communication performance of a plurality of processes is estimated in the above example, and the wireless communication performance of only one process can also be estimated in the same manner. This point also applies to the other embodiments.

Second Embodiment

In a second embodiment, when performing the simple simulation in which a part of the installed objects described in the first embodiment are extracted, a criterion for determining whether an installed object is to be extracted is set for each application. An operation of the present embodiment is similar to that of the first embodiment, and differences therefrom will be mainly described below.

In the first embodiment, the extraction condition table 530 indicating the condition common to all the applications is used. In contrast, an extraction condition table of the present embodiment indicates conditions set and registered for each application. FIG. 10 shows a configuration example of an extraction condition table 810 according to the second embodiment.

The extraction condition table 810 includes an application column 811, a shielding column 812, a parameter column 813, and a calculation exclusion possibility condition column 814. The application column 811 indicates an identifier of a type of an application to which an extraction condition is applied. The shielding column 812, the parameter column 813, and the calculation exclusion possibility condition column 814 are the same as the shielding column 531, the parameter column 532, and the calculation exclusion possibility condition column 533 of the extraction condition table shown in FIG. 5D.

The radio performance calculation unit 121 determines the installed object to be extracted in the simple simulation by using the extraction condition corresponding to the application from the extraction condition table 810. For example, for an application that requires high radio performance estimation accuracy, a condition for extracting more installed objects is set. For example, the number of extracted objects can be increased by decreasing a threshold value of a size of the installed object and/or increasing a threshold value of a distance. Although the propagation simulation time increases due to the increase in the number of extracted objects, estimation accuracy is improved.

According to the second embodiment, accuracy of the simple simulation can be variable according to the type of the application, and accuracy of wireless propagation performance estimation and the calculation time can be adjusted.

Third Embodiment

In a third embodiment, when performing the simple simulation in which a part of the installed objects described in the first embodiment are extracted, a criterion for determining whether an installed object is to be extracted is set for each wireless communication method (wireless system)

(for example, Wi-Fi 5, Wi-Fi 6, private-LTE, and millimeter wave local 5G). An operation of the present embodiment is similar to that of the first embodiment, and differences therefrom will be mainly described below.

In the first embodiment, the extraction condition table 530 indicating the condition common to all the applications is used. In contrast, an extraction condition table of the present embodiment indicates, for example, conditions set and registered for each wireless system. FIG. 11 shows a configuration example of an extraction condition table 820 according to the third embodiment.

The extraction condition table 820 includes a wireless system column 821, a shielding column 822, a parameter column 823, and a calculation exclusion possibility condition column 824. The wireless system column 821 indicates an identifier of a type of a wireless system to which an extraction condition is applied. The shielding column 822, the parameter column 823, and the calculation exclusion possibility condition column 824 are the same as the shielding column 531, the parameter column 532, and the calculation exclusion possibility condition column 533 of the extraction condition table shown in FIG. 5D.

For example, in Wifi or the like having a relatively long wavelength, the number of installed objects to be extracted can be reduced by setting the threshold value of the size to be large. Alternatively, the number of installed objects to be extracted can be reduced by setting the threshold value of the distance to be small in consideration of high straightness in 5G using millimeter waves.

According to the third embodiment, the accuracy of the simple simulation can be variable according to the type of the wireless system, and the accuracy of the wireless propagation performance estimation and the calculation time can be adjusted.

Fourth Embodiment

In a fourth embodiment, in addition to or instead of the heat map 390 shown in FIG. 9C, whether each application is operable under an estimated received power condition is output to an output result output by the radio performance estimation system. In the present embodiment, the radio performance calculation information includes information on application availability determination.

Figures 12A, 12B:
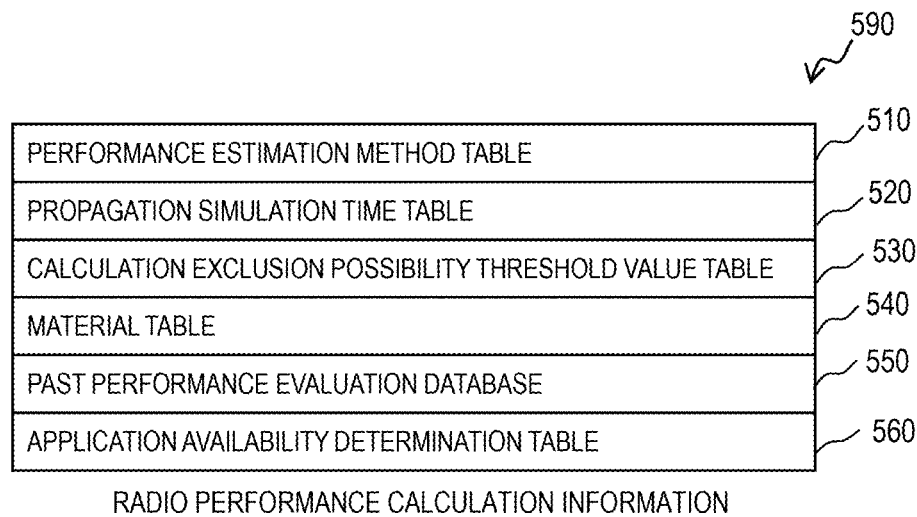
FIG. 12A is a diagram of radio performance calculation information according to a fourth embodiment.
FIG. 12B is a diagram of an application availability determination table according to the fourth embodiment.

FIG. 12A shows a configuration example of radio performance calculation information 590 according to the fourth embodiment. The radio performance calculation information 590 includes the performance estimation method table 510, the propagation simulation time table 520, the extraction condition table 530, the material table 540, the past performance evaluation database 550, and an application availability determination table 560. Elements other than the application availability determination table 560 are the same as those described in the first embodiment.

FIG. 12B shows a configuration example of the application availability determination table 560. For example, the application availability determination table 560 can be input by a radio technician in the step 603 shown in FIG. 6.

The application availability determination table 560 includes an application column 561, a required power (base station) column 562, and a required power (terminal) column 563. The application column 561 indicates an identifier of a type of an application.

The required power (base station) column 562 indicates radio wave reception power (threshold value) required for the base station of the wireless communication used by the application. The required power (terminal) column 563 indicates radio wave reception power (threshold value) required for the terminal of the wireless communication used by the application. The required power in each of the columns 562 and 563 is represented by dBm. When the required power of both the base station and the wireless terminal is set, conditions of both the base station and the wireless terminal are required to be satisfied.

In step 711 shown in FIG. 7, after the radio performance estimation is completed, the radio performance calculation unit 121 determines whether the estimated radio performance satisfies conditions required by each application.

Specifically, the radio performance calculation unit 121 refers to the process plan shown in FIG. 4, and acquires information on positions of the radio base station and the wireless terminal used in each process and the application to be used. The radio performance calculation unit 121 refers to the heat map 390 indicating a distribution of radio wave reception power, and acquires s radio wave reception power intensity of the radio base station and each wireless terminal.

The radio performance calculation unit 121 determines whether the radio wave reception power of the base station and each wireless terminal exceeds a threshold value indicated by the application availability determination table 560. The radio performance calculation unit 121 includes, in the radio performance estimation result presented to the user, a determination result as to whether the estimated radio performance satisfies conditions required by each application.

In a case where the radio wave reception power indicated by the heat map 390 is equal to or higher than each threshold value of the application indicated by the application availability determination table 560, a determination result indicating that the application is operable is shown. In a case where the radio wave reception power indicated by the heat map 390 is less than any threshold value of the application indicated by the application availability determination table 560, a determination result indicating that the application is not operable is shown.

According to the fourth embodiment, a site manager who obtains the output result of the radio performance estimation system can more directly know whether a process operation is available.

Other Embodiments

In an embodiment of the present specification, the propagation simulator 122 and other simulators are used together. For example, a network simulator can be used in addition to the propagation simulator 122. A known network simulator can be used. The network simulator executes a simulation by using the radio performance estimation result provided by the propagation simulator 122. The network simulator can estimate throughput, packet loss, delay, and the like of the wireless communication in addition to information on received power.

In an embodiment of the present specification, the items input by the site manager in the process plan 200 may be added to enable customization in accordance with a situation of the site. For example, the following operation may be performed.

In a first operation example, the site manager can set whether it is necessary to complete the radio performance estimation calculation by a predetermined time before a process start time. The radio performance calculation unit 121 determines a schedule such that the radio performance estimation processing is completed by a time set for each process. As a result, it is possible to take certain measures during a time between the acquisition of the radio performance estimation result and the start of the process.

In a second operation example, the site manager may assign priorities to the processes. The radio performance calculation unit 121 sequentially selects the processes from the processes having high priorities and determines the radio performance estimation methods. When there are processes having the same priority, a process having an earlier designated time may be selected. According to the priority, for example, a highly accurate estimation method can be applied to a process whose deadline is close and reliable performance is required.

In the above embodiment, the radio performance estimation method of each process is determined so as to be terminated before the start of the corresponding process by the time set for the corresponding process. For example, when no time is set for the process, the wireless communication estimation method may be determined under a condition without required completion time.

The present invention is not limited to the embodiments described above, and includes various modifications. For example, the above-described embodiments have been described in detail for easy understanding of the present invention, and the present invention is not necessarily limited to those including all the configurations described above. In addition, a part of the configurations of one embodiment can be replaced with a configuration of another embodiment, and a configuration of one embodiment can be added to a configuration of another embodiment. In addition, a part of configurations of each embodiment can be add to, reduced from, or replaced with another configuration.

In addition, each of the above configurations, functions, processing units, or the like may be partially or entirely implemented by hardware such as design using an integrated circuit. In addition, each of the above-described configurations, functions, and the like may be implemented by software by interpreting and executing a program for implementing each function by a processor. Information such as a program, a table, and a file for implementing each function can be stored in a recording device such as a memory, a hard disk, and a solid state drive (SSD), or a recording medium such as an IC card or an SD card.

In addition, control lines and information lines that are considered to be necessary for explanation are shown, and all control lines and information lines are not necessarily shown in a product. Actually, it may be considered that almost all the configurations are connected to each other.

What is claimed is:

1. A system for estimating radio performance of a manufacturing site, the system comprising:
   one or more storage devices; and
   one or more arithmetic devices,
   wherein the one or more storage devices store:
   process information including information on one or more processes before starting at the manufacturing site; and
   management information that manages one or more radio performance estimation methods usable for each of a plurality of applications and information for determining a processing time of each of the one or more radio performance estimation methods,
   wherein the process information includes information on one or more applications used in each process of the one or more processes and information on a time associated with each process, and
   wherein the one or more arithmetic devices are configured to:
   refer to the process information and the management information so as to determine one or more radio performance estimation methods usable in each process, and
   refer to the process information and the management information so as to select a wireless communication method, through which radio performance estimation processing is completed by a time associated with each process, from the one or more radio performance estimation methods usable in each process,
   wherein the process information includes position information on an installed object including a wireless communication device in each process,
   wherein the radio performance estimation method used in the one or more processes includes a first propagation simulation of a radio wave and a second propagation simulation with lower accuracy and more calculation processing than the first propagation simulation, and
   wherein the first propagation simulation and the second propagation simulation execute a simulation based on the position information on the installed object.

2. The system according to claim 1, wherein
the radio performance estimation method used in the one or more processes includes quotation of a radio performance estimation value from a past radio performance estimation result.

3. The system according to claim 2, wherein
as for the quotation of the radio performance estimation value, the one or more arithmetic devices quote a radio performance estimation value of a process of the same product as a target process.

4. The system according to claim 1, wherein
the information for determining the processing time indicates a relationship between a processing time of the first propagation simulation and the second propagation simulation and the number of installed objects.

5. The system according to claim 4, wherein
the one or more arithmetic devices
extract a part of installed objects from installed objects of a selected process, and
determine a time required for the second propagation simulation for the selected process based on the number of the part of the installed objects and the information for determining the processing time.

6. The system according to claim 5, wherein
the one or more arithmetic devices extract the part of the installed objects based on a positional relationship between a wireless communication device in the selected process and another installed object.

7. The system according to claim 5, wherein
the one or more arithmetic devices determine a time required for the first propagation simulation for the selected process based on the information for determining the processing time under a condition that all installed objects of the selected process are present.

8. The system according to claim 5, wherein
the one or more arithmetic devices extract the part of installed objects based on an extraction condition set for each application or each wireless communication method.

9. The system according to claim 1, wherein
the process information includes information on a plurality of processes scheduled to be executed at the manufacturing site, and
the one or more arithmetic devices select a combination of radio performance estimation methods of the plurality of processes, which has a longest total calculation time required for radio performance estimation of the plurality of processes, under a condition that the radio performance estimation processing on each process of the plurality of processes is completed by a time associated with each process.

10. A method of estimating radio performance of a manufacturing site by a system, the system storing:

process information including information on one or more processes before starting at the manufacturing site; and management information that manages one or more radio performance estimation methods usable for each of a plurality of applications and information for determining a processing time of each of the one or more radio performance estimation methods, the process information including information on one or more applications used in each process of the one or more processes and information on a time associated with each process, the method comprising:

referring to, by the system, the process information and the management information so as to determine one or more radio performance estimation methods usable in each process; and referring to, by the system, the process information and the management information so as to select a wireless communication method, through which radio performance estimation processing is completed by a time associated with each process, from the one or more radio performance estimation methods usable in each process, wherein the process information includes position information on an installed object including a wireless communication device in each process, wherein the radio performance estimation method used in the one or more processes includes a first propagation simulation of a radio wave and a second propagation simulation with lower accuracy and more calculation processing than the first propagation simulation, and wherein the first propagation simulation and the second propagation simulation execute a simulation based on the position information on the installed object.

* * * * *